US005970442A

United States Patent [19]

Timner

[11] Patent Number: 5,970,442

[45] Date of Patent: Oct. 19, 1999

[54] GAIN QUANTIZATION IN ANALYSIS-BY-SYNTHESIS LINEAR PREDICTED SPEECH CODING USING LINEAR INTERCODEBOOK LOGARITHMIC GAIN PREDICTION

[75] Inventor: Ylva Timner, Umeå, Sweden

[73] Assignee: Telefonaktiebolaget LM Ericsson, Stockholm, Sweden

[21] Appl. No.: 08/961,867

[22] Filed: Oct. 31, 1997

Related U.S. Application Data

[63] Continuation of application No. PCT/SE96/00481, Apr. 12, 1996.

[30] Foreign Application Priority Data

May 3, 1995 [SE] Sweden .................................. 9501640

[51] Int. Cl.[6] ........................................................ G01L 9/14

[52] U.S. Cl. ............................................ 704/219; 704/223

[58] Field of Search ..................................... 704/219, 223

[56] References Cited

U.S. PATENT DOCUMENTS

| | | | |
|---|---|---|---|
| 5,313,554 | 5/1994 | Ketchum | 704/219 |
| 5,327,520 | 7/1994 | Chen | 704/219 |
| 5,615,298 | 3/1997 | Chen | 704/228 |

FOREIGN PATENT DOCUMENTS

| | | | |
|---|---|---|---|
| 501 420 | 9/1992 | European Pat. Off. | G10L 9/16 |
| 577 488 | 1/1994 | European Pat. Off. | G10L 9/18 |
| 2 258 978 | 2/1993 | United Kingdom | G10L 9/14 |

OTHER PUBLICATIONS

CCITT Recommendation G.728, "Coding of Speech at 16 hbit/s Using Low–Delay Code Excited Linear Prediction," pp. 12–17 (Sep. 1992).

B.S. Atal et al., "A New Model of LPC Excitation for Producing Natural–Sounding Speech at Low Bit Rates," IEEE ICASSP–82, pp. 614–617, Paris (1982).

J–H Chen et al., "Gain–Adaptive Vector Quantization with Application to Speech Coding," IEEE Trans. on Communications, vol. COM–35, No. 9, pp. 918–930 (Sep. 1987).

J.H. Chung et al., "Vector Excitation Homomorphic Vocoder," Advances in Speech Coding, Ch.22, pp. 235–243 (1991).

I.A. Gerson et al., "Vector Sum Excited Linear Prediction (VSELP)," Advances in Speech Coding, Ch. 7 (1991).

P. Hedelin et al., "Amplitude Quantization for CELP Excitation Signals," IEEE ICASSP '91, pp. 225–228 (1991).

P. Hedelin, "A Multi–Stage Perspective on CELPO Speech Coding," IEEE ICASSP'92, pp. I–57 through I–60 (1992).

P. Kroon et al., "A Class of Analysis–by–Synthesis Predictive Coders for High Quality Speech Coding at Rates Between 4.8 and 16 kbits/s," IEEE Journal on Selected Areas in Communications, vol. 6, No. 2, pp. 353–363 (Feb. 1988).

N. Moreau et al., "Selection of Excitation Vectors for the CELP Coders," IEEE Transactions on Speech and Audio Processing, vol. 2, No. 1, part 1, pp. 29–41 (Jan. 1994).

R.A. Salami, "Binary Pulse Excitation: A Novel Approach to Low Complexity CELP Coding," Kluwer Academic Pub., Advances in Speech Coding, pp. 145–156 (1991).

(List continued on next page.)

*Primary Examiner*—David R. Hudspeth
*Assistant Examiner*—Tālivaldis Ivars Šmits
*Attorney, Agent, or Firm*—Burns, Doane, Swecker & Mathis, L.L.P.

[57] ABSTRACT

A gain quantization method, in analysis-by-synthesis linear predictive speech coding, includes these steps: determine a first gain for an optimal excitation vector from a first code book; quantize the first gain; determine an optimal second gain for an optimal excitation vector from a second code book; determine a linear prediction of the logarithm of the second gain from the quantized first gain; and quantize the difference between the logarithm of the second gain and the linear prediction.

11 Claims, 8 Drawing Sheets

Microfiche Appendix Included
(1 Microfiche, 40 Pages)

OTHER PUBLICATIONS

R. Salami et al., "ACELP Speech Coding at 8 kbit/s with a 10 ms Frame: A Candidate for CCITT Standardization," IEEE Workshop on Speech Coding for Telecommunications, Sainte–Adele, pp. 23–24 (1993).

Nicolas Morau and Przemyslaw Dymarski, "Selection of Excitation Vectors for the CELP Coders," IEEE Trans. Speech and Audio Processing, vol. 2, No. 1, Part 1, pp. 29–41, Jan. 1994.

Kasunori Mano, "Design of a Toll–Quality 4–Kbit/s Speech Coder Based on Phase–Adaptive PSI–CELP", Proc. IEEE ICASSP 97, pp. 755–758, Apr. 1997.

GAIN QUANTIZATION IN ANALYSIS-BY-SYNTHESIS LINEAR PREDICTED SPEECH CODING USING LINEAR INTERCODEBOOK LOGARITHMIC GAIN PREDICTION

This application is a continuation of International Application No. PCT/SE96/00481, filed Apr. 12, 1996, which designates the United States.

TECHNICAL FIELD

The present invention relates to a gain quantization method in analysis-by-synthesis linear predicitive speech coding, especially for mobile telephony. This application includes a microfiche appendix consisting of 1 microfiche and 40 frames.

BACKGROUND

Analysis-by-synthesis linear predictive speech coders usually have a long-term predictor or adaptive code book followed by one or several fixed code books. Such speech coders are for example described in [1]. The total excitation vector in such speech coders may be described as a linear combination of code book vectors $V_i$, such that each code book vector $V_i$ is multiplied by a corresponding gain $g_i$. The code books are searched sequentially. Normally the excitation from the first code book is subtracted from the target signal (speech signal) before the next code book is searched. Another method is the orthogonal search, where all the vectors in later code books are orthogonalized by the selected code book vectors. Thus, the code books are made independent and can all be searched towards the same target signal.

Search methods and gain quantization for a generalized CELP coder having an arbitrary number of code books are discussed in [2].

The gains of the code books are normally quantized separately, but can also be vector quantized together.

In the coder described in [3], two fixed code books are used together with an adaptive code book. The fixed code books are searched orthogonalized. The fixed code book gains are vector quantized together with the adaptive code book gain, after transformation to a suitable domain. The best quantizer index is found by testing all possibilities in a new analysis-by-synthesis loop. A similar quantization method is used in the ACELP coder [4], but in this case the standard code book search method is used.

A method to calculate the quantization boundaries adaptively, using the selected LTP vector and, for the second code book, the selected vector from the first code book, is described in [5, 6].

In [2] a method is suggested, according to which the LTP code book gains are quantized relative to normalized code book vectors. The adaptive code book gain is quantized relative to the frame energy. The ratios $g_2/g_1$, $g_3/g_2$, . . . are quantized in non-uniform quantizers. To use vector quantization of the gains, the gains must be quantized after the excitation vectors have been selected. This means that the exact gain of the first searched code books are not known at the time of the later code book searches. If the traditional search method is used, the correct target signal cannot be calculated for the later code books, and the later searches are therefore not optimal.

If the orthogonal search method is used, the code book searches are independent of previous code book gains. The gains are thus quantized after the code book searches, and vector quantization may be used. However, the orthogonalization of the code books is often very complex, and it is usually not feasible, unless as in [3], the code books are specially designed to make the orthogonalization efficient. When vector quantization is used, the best gains are normally selected in a new analysis-by-synthesis loop. Since the gains are scalar quantities, they can be moved outside the filtering process, which simplifies the computations as compared to the analysis-by-synthesis loops in the code book searches, but the method is still much more complex than independent quantization. Another drawback is that the vector index is very vulnerable to channel errors, since an error in one bit in the index gives a completely different set of gains. In this respect independent quantization is a better choice.

However, for this method more bits must be used to achieve the same performance as other quantization methods.

The method with adapted quantization limits described in [5, 6] involves complex computations and is not feasible in a low complexity system as mobile telephony. Also, since the decoding of the last code book gain is dependent on correct transmission of all previous gains and vectors, the method is expected to be very sensitive to channel errors.

Quantization of gain ratios, as described in [2], is robust to channel errors and not very complex. However, the methods requires the training of a non uniform quantizer, which might make the coder less robust to other signals not used in the training. The method is also very inflexible.

SUMMARY

An object of the present invention is an improved gain quantization method in analysis-by-synthesis linear predictive speech coding that reduces or eliminates most of the above problems. Especially, the method should have low complexity, give quantized gains that are unsensitive to channel errors and use fewer bits than the independent gain quantization method.

The above objects are achieved by a method of gain quantization that includes the steps of: determining an optimal first gain for an optimal first vector from a first code book; quantizing the optimal first gain; determining an optimal second gain for an optimal second vector from a second code book; determining a first linear prediction of the logarithm of the optimal second gain from at least the quantized optimal first gain; and quantizing a first difference between the logarithm of the optimal second gain and the first linear prediction.

BRIEF DESCRIPTION OF THE DRAWINGS

The invention, together with further objects and advantages thereof, may best be understood by making reference to the following description taken together with the accompanying drawings, in which.

DETAILED DESCRIPTION

The numerical example in the following description will refer to the European GSM system. However, it is appreciated that the principles of the present invention may be applied to other cellular systems as well.

Throughout the drawings the same referens designations will be used for corresponding or similar elements.

Before the gain quantization method in accordance with the present invention is described, it is helpful to first describe examples of speech coders in which the invention may be used. This will now be done with reference to FIG. 1 and 2.

Figure 1:
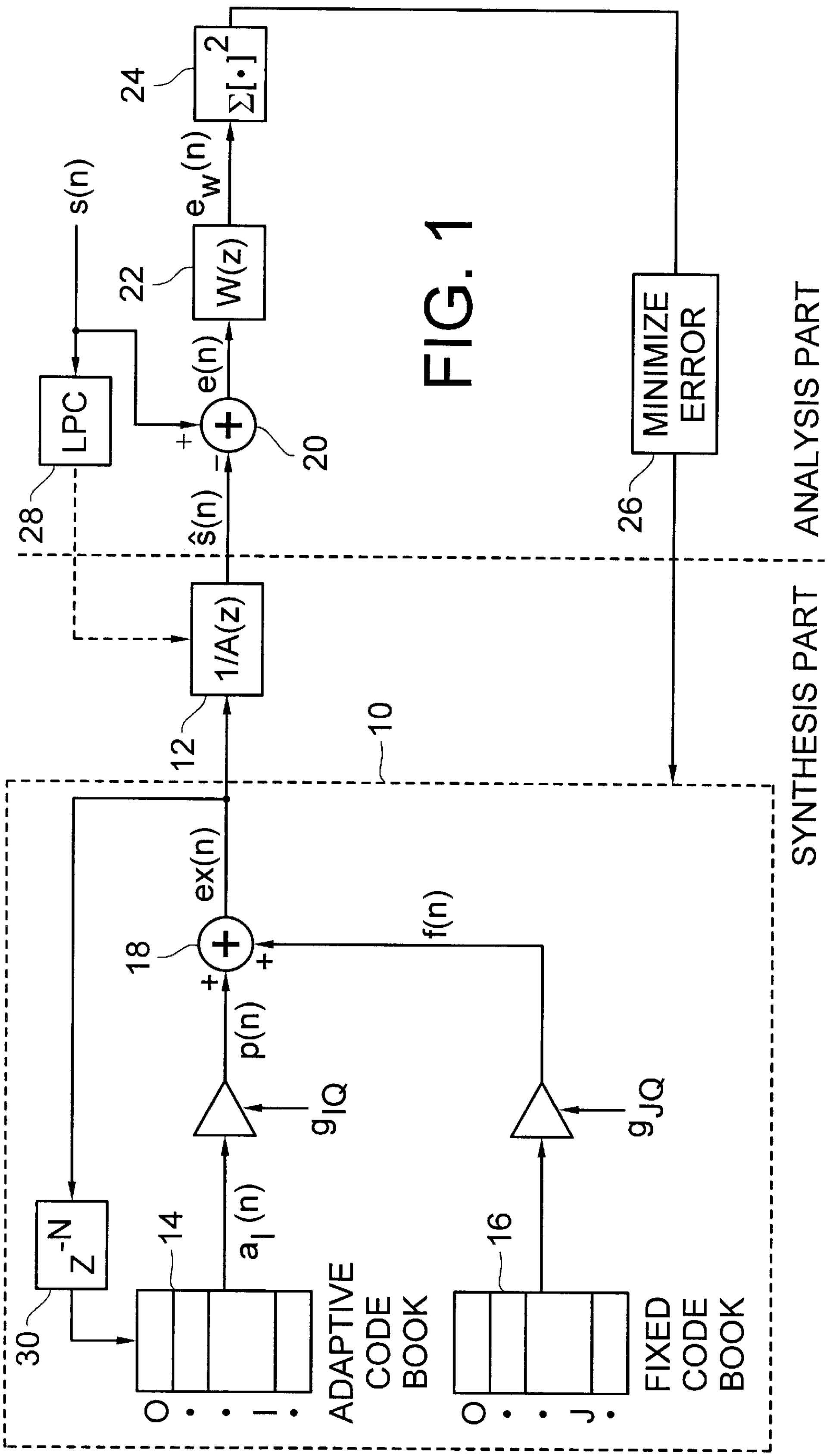
FIG. 1 is a block diagram of an embodiment of an analysis-by-synthesis linear predictive speech coder in which the method of the present invention may be used.

FIG. 1 shows a block diagram of an example of a typical analysis-by-synthesis linear predictive speech coder. The coder comprises a synthesis part to the left of the vertical dashed center line and an analysis part to the right of said line. The synthesis part essentially includes two sections, namely an excitation code generating section 10 and an LPC synthesis filter 12. The excitation code generating section 10 comprises an adaptive code book 14, a fixed code book 16 and an adder 18. A chosen vector $a_I(n)$ from the adaptive code book 14 is multiplied by a gain factor $g_{IQ}$ (Q denotes quantized value) for forming a signal p(n). In the same way an excitation vector from the fixed code book 16 is multiplied by a gain factor $g_{JQ}$ for forming a signal f(n). The signals p(n) and f(n) are added in adder 18 for forming an excitation vector ex(n), which excites the LPC synthesis filter 12 for forming an estimated speech signal vector $\hat{s}(n)$.

In the analysis part the estimated vector $\hat{s}(n)$ is subtracted from the actual speech signal vector s(n) in an adder 20 for forming an error signal e(n). This error signal is forwarded to a weighting filter 22 for forming a weighted error vector $e_W(n)$. The components of this weighted error vector are squared and summed in a unit 24 for forming a measure of the energy of the weighted error vector.

A minimization unit 26 minimizes this weighted error vector by choosing that combination of gain $g_{IQ}$ and vector from the adaptive code book 12 and that gain $g_{JQ}$ and vector from the fixed code book 16 that gives the smallest energy value, that is which after filtering in filter 12 best approximates the speech signal vector s(n). This optimization is divided into two steps. In the first step it is assumed that f(n)=0 and the best vector from the adaptive code book 14 and the corresponding $g_{IQ}$ are determined. An algorithm for determining these parameters is given in the enclosed microfiche APPENDIX. When these parameters have been determined, a vector and corresponding gain $g_{JQ}$ are chosen from the fixed code book 16 in accordance with a similar algorithm. In this case the determined parameters of the adaptive code book 14 are locked to their determined values.

The filter parameters of filter 12 are updated for each speech signal frame (160 samples) by analyzing the speech signal frame in a LPC analyzer 28. This updating has been marked by the dashed connection between analyzer 28 and filter 12. Furthermore, there is a delay element 30 between the output of adder 18 and the adaptive code book 14. In this way the adaptive code book 14 is updated by the finally chosen excitation vector ex(n). This is done on a subframe basis, where each frame is divided into four subframes (40 samples).

Figure 2:
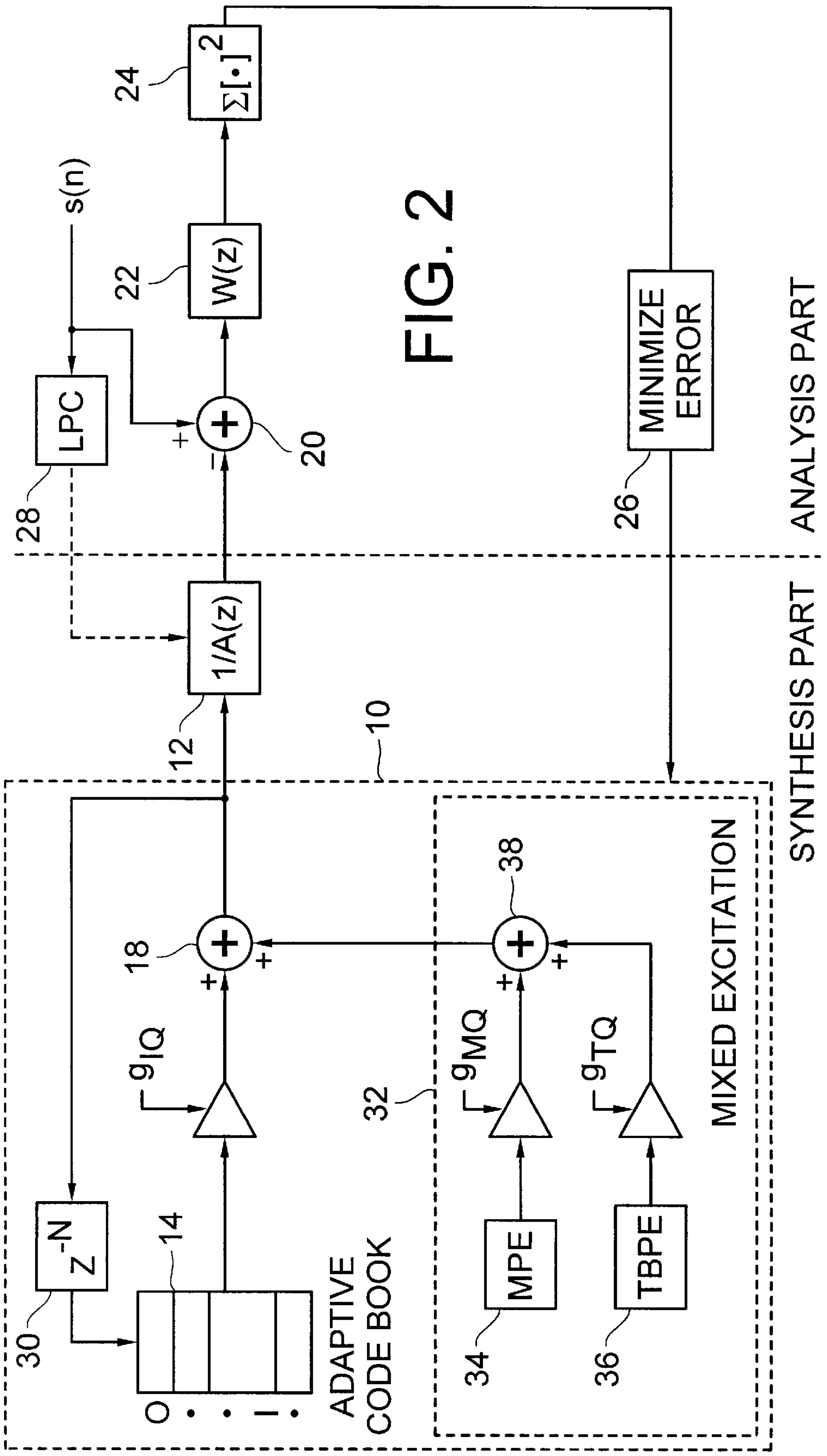
FIG. 2 is a block diagram of another embodiment of an analysis-by-synthesis linear predictive speech coder in which the method of the present invention may be used.

FIG. 2 illustrates another embodiment of a speech coder in which the method accordance with the present invention may be used. The essential difference between the speech coder of FIG. 1 and the speech coder of FIG. 2 is that the fixed code book 16 of FIG. 1 has been replaced by a mixed excitation generator 32 comprising the multi-pulse excitation (MPE) generator 34 and a transformed binary pulse excitation (TBPE) generator 36. These two excitations will be briefly described below. The corresponding block gains have been denoted $g_{MQ}$ and $g_{TQ}$, respectively, in FIG. 2. The excitations from generators 34, 36 are added in an adder 38, and the mixed excitation is added to the adaptive code book excitation in adder 18.

Figure 3:
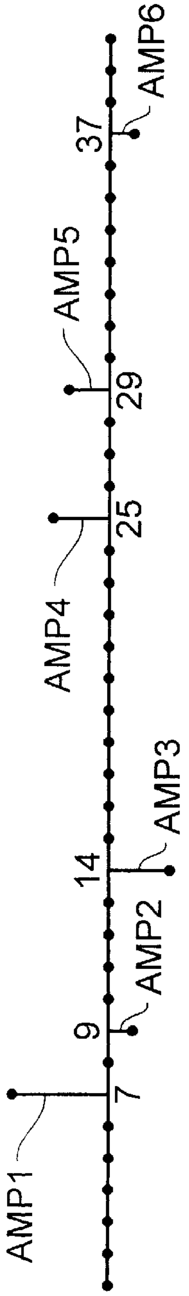
FIG. 3 illustrates the principles of multi-pulse excitation (MPE)

Multi-pulse excitation is illustrated in FIG. 3 and is described in detail in [7] and also in the enclosed C++ program listing. FIG. 2 illustrates 6 pulses distributed over a subframe of 40 samples (=5 ms). The excitation vector may be described by the positions of these pulses (positions 7, 9, 14, 25, 29, 37 in the example) and the amplitudes of the pulses (AMP1–AMP6 in the example). Methods for finding these parameters are described in [7]. Usually the amplitudes only represent the shape of the excitation vector. Therefore a block gain $g_{MQ}$ (see FIG. 2) is used to represent the amplification of this basic vector shape.

Figure 4:
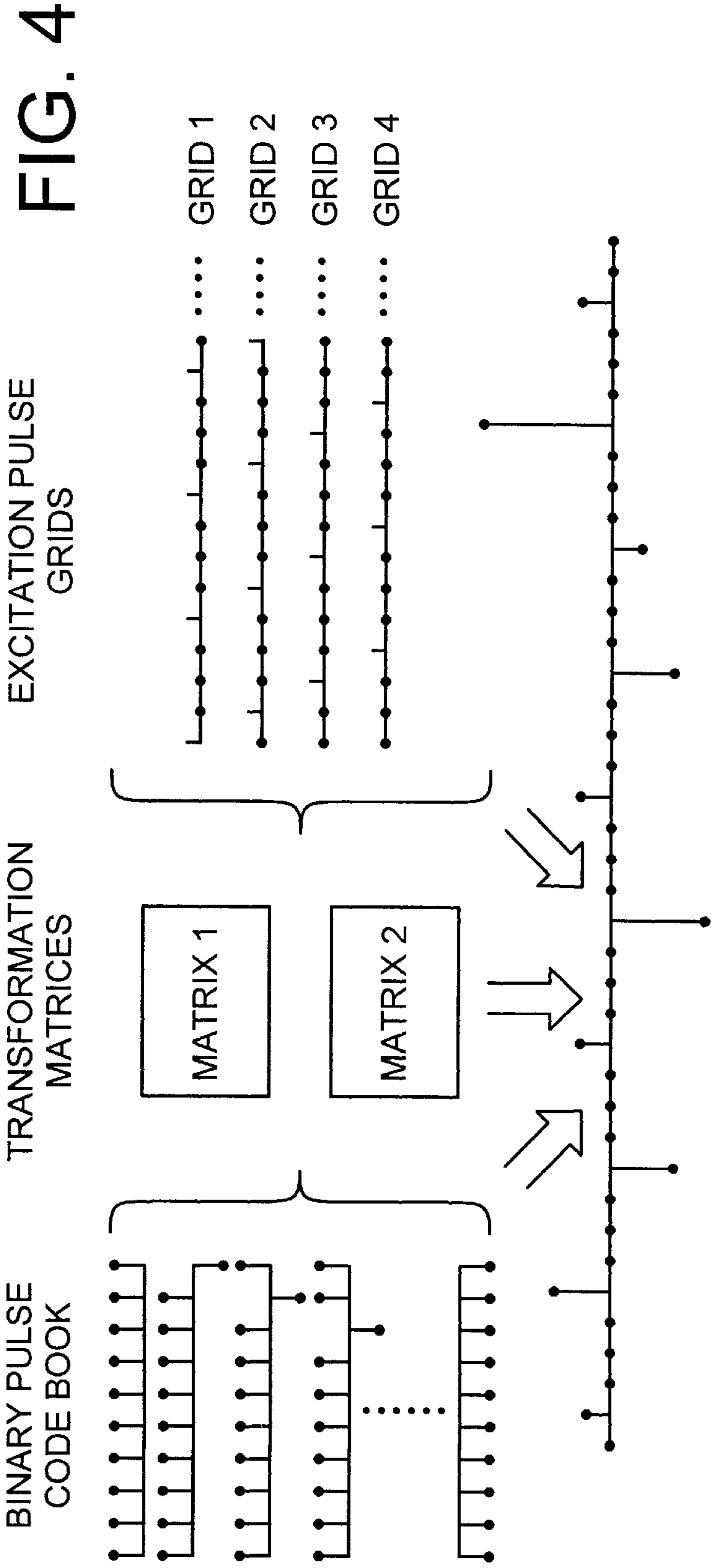
FIG. 4 illustrates the principles of transformed binary pulse excitation (TBPE)

FIG. 4 illustrates the principles behind transformed binary pulse excitation which are described in detail in [8] and in the enclosed program listing. The binary pulse code book may comprise vectors containing for example 10 components. Each vector component points either up (+1) or down (−1) as illustrated in FIG. 4. The binary pulse code book contains all possible combinations of such vectors. The vectors of this code book may be considered as the set of all vectors that point to the "corners" of a 10-dimensional "cube". Thus, the vector tips are uniformly distributed over the surface of a 10-dimensional sphere.

Furthermore, TBPE contains one or several transformation matrices (MATRIX 1 and MATRIX 2 in FIG. 4). These are precalculated matrices stored in ROM. These matrices operate on the vectors stored in the binary pulse code book to produce a set of transformed vectors. Finally, the transformed vectors are distributed on a set of excitation pulse grids. The result is four different versions of regularly spaced "stochastic" code books for each matrix. A vector from one of these code books (based on grid 2) is shown as a final result in FIG. 4. The object of the search procedure is to find the binary pulse code book index of the binary code book, the transformation matrix and the excitation pulse grid that together give the smallest weighted error. These parameters are combined with a gain $g_{TQ}$ (see FIG. 2).

Figure 5:
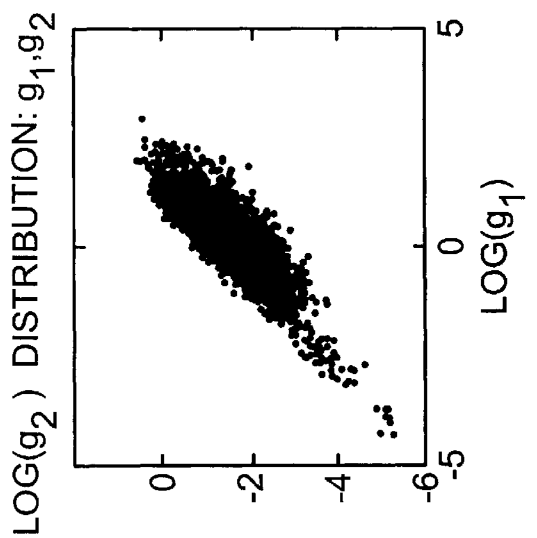
FIG. 5 illustrates the distribution of an optimal gain from a code book and an optimal gain from the next code book.
Figure 6:
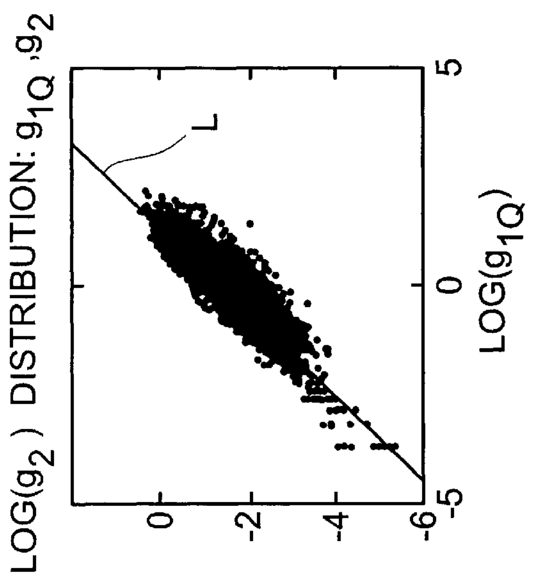
FIG. 6 illustrates the distribution between the quantized gain from a code book and an optimal gain from the next code book.

In the speech coders illustrated in FIGS. 1 and 2, the gains $g_{IQ}$, $g_{JQ}$, $g_{MQ}$ and $g_{TQ}$ have been quantized completely independent of each other. However, as may be seen from FIG. 5 there is a strong correlation between gains of different code books. In FIG. 5 the distribution between the logarithm of a gain $g_1$ corresponding to an MPE code book and the logarithm of the gain $g_2$ corresponding to a TBPE code book is shown. FIG. 6 shows a similar diagram, however, in this case gain $g_1$ has been quantized. Furthermore, in FIG. 6 a line L has been indicated. This line, which may be found by regression analysis, may be used to predict $g_2$ from $g_{1Q}$, which will be further described below. The data points in FIG. 5 and 6 have been obtained from 8000 frames.

As FIGS. 5 and 6 indicate, there is a strong correlation between gains belonging to different code books. By calculating a large number of quantized gains $g_{1Q}$ from a first code book and corresponding gains (unquantized) $g_2$ for a second code book in corresponding frames and determining line L, this line may be used as a linear predictor, which predicts the logarithm of $g_2$ from the logarithm of $g_{1Q}$ in accordance with the following formula:

$$\log(\hat{g}_2)=b+c\cdot\log(g_{1Q})$$

where $\hat{g}_2$ represents the predicted gain $g_2$. In accordance with an embodiment of the present invention, instead of quantizing $g_2$ the difference $\delta$ between the logarithms of the actual and predicted gain $g_2$ is calculated in accordance with the formula $$\delta=\log(g_2)-\log(\hat{g}_2)=\log(g_2)-(b+c\cdot\log(g_{1Q}))$$

and thereafter quantized.

Figure 7:
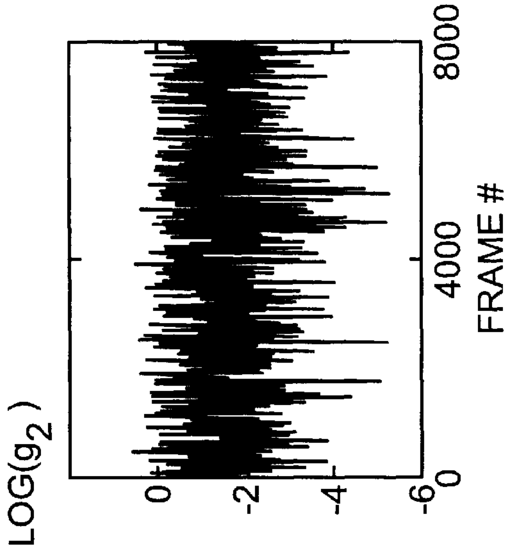
FIG. 7 illustrates the dynamic range of an optimal gain of a code book.
Figure 8:
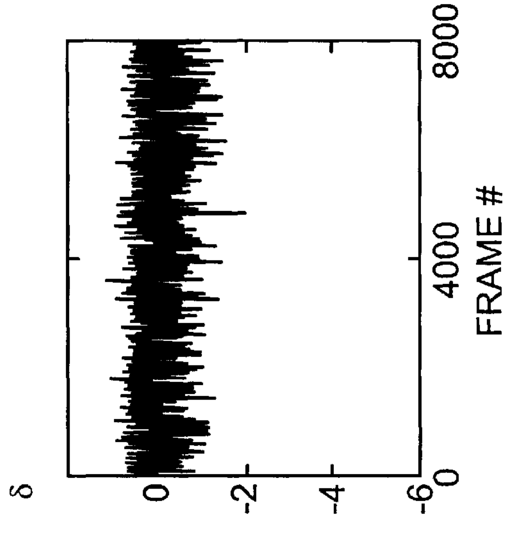
FIG. 8 illustrates the smaller dynamic range of a parameter δ that, in accordance with the present invention, replaces the gain of FIG. 7.

FIGS. 7 and 8 illustrate one advantage obtained by the above method. FIG. 7 illustrates the dynamic range of gain $g_2$ for 8000 frames. FIG. 8 illustrates the corresponding dynamic range for $\delta$ in the same frames. As can be seen from FIGS. 7 and 8 the dynamic range of $\delta$ is much smaller than the dynamic range of $g_2$. This means that the number of quantization levels for $\delta$ can be reduced significantly, as compared to the number of quantization levels required for $g_2$. To achieve good performance in the quantization, 16 levels are often used in the gain quantization. Using $\delta$-quantization in accordance with the present invention an equivalent performance can be obtained using only 6 quantization levels, which equals a bit rate saving of 0.3 kb/s.

Since the quantities b and c are predetermined and fixed quantities that are stored in the coder and the decoder, the gain $g_2$ may be reconstructed in the decoder in accordance with the formula $$g_2=[g_{1Q}]^c\cdot\exp(b+\delta_Q)$$

where $g_{1Q}$ and $\delta_Q$ have been transmitted and received at the decoder.

The correlation between the code book gains is highly dependent on the energy levels in the code book vectors. If the energy in the code book is varying, the vector energy could be included in the prediction to improve the performance. In [2] normalized code book vectors are used, which eliminates this problems. However, this method may be complex if the code book is not automatically normalized and has many non-zero components. Instead the factor $g_1$ may be modified to better represent the excitation energy of the previous code book before being used in the prediction. Thus, the formula for $\delta$ may be modified in accordance with:

$$\delta=\log(g_2)-(b+c\cdot\log(E^{1/2}\cdot g_{1Q}))$$

where E represents the energy of the vector that has been chosen from code book 1. The excitation energy is calculated and used in the search of the code book, so no extra computations must be performed.

If the first code book is the adaptive code book, the energy varies strongly, and most components are usually non-zero. Normalizing the vectors would be a computationally complex operation. However, if the code book is used without normalization, the quantized gain may be multiplied by the square root of the vector energy, as indicated above, to form a good basis for the prediction of the next code book gain.

An MPE code book vector has a few non-zero pulses with varying amplitudes and signs. The vector energy is given by the sum of the squares of the pulse amplitudes. For prediction of the next code book gain, e.g. the TBPE code book gain, the MPE gain may be modified by the square root of the energy as in the case of the adaptive code book. However, equivalent performance is obtained if the mean pulse amplitude (amplitudes are always positive) is used instead, and this operation is less complex. The quantized gains $g_{1Q}$ in FIG. 6 were modified using this method.

The above discussed energy modification gives the following formula for $g_2$ at the decoder:

$$g_2=[E^{1/2}\cdot g_{1Q}]^c\cdot\exp(b+\delta_Q)$$

Since the excitation vectors are available also at the decoder, the energy E does not have to be transmitted, but can be recalculated at the decoder.

An example algorithm, in which the first gain is an MPE gain and the second gain is a TBPE gain, is summarized below:

EXAMPLE ALGORITHM

```
LPC analysis
Subframe_nr = 1...4
        LTP analysis
        MPE analysis
                Search for the best vector
                Calculate optimal gain
                Quantize gain
                Update target vector
        TBPE analysis
                Search for the best vector
                Quantize gain
                        Calculate optimal gain
                        Calculate prediction based on logarithm of
                                MPE pulse mean amplitude * MPE gain
                        Calculate δ
                        Quantize δ
                        Calculate quantized gain
        State update
```

In this algorithm the LPC analysis is performed on a frame by frame basis, while the remaining steps LTP analysis, MPE excitation, TBPE excitation and state update are performed on a subframe by subframe basis. In the algorithm the MPE and TBPE excitation steps have been expanded to illustrate the steps that are relevant for the present invention.

Figure 9:
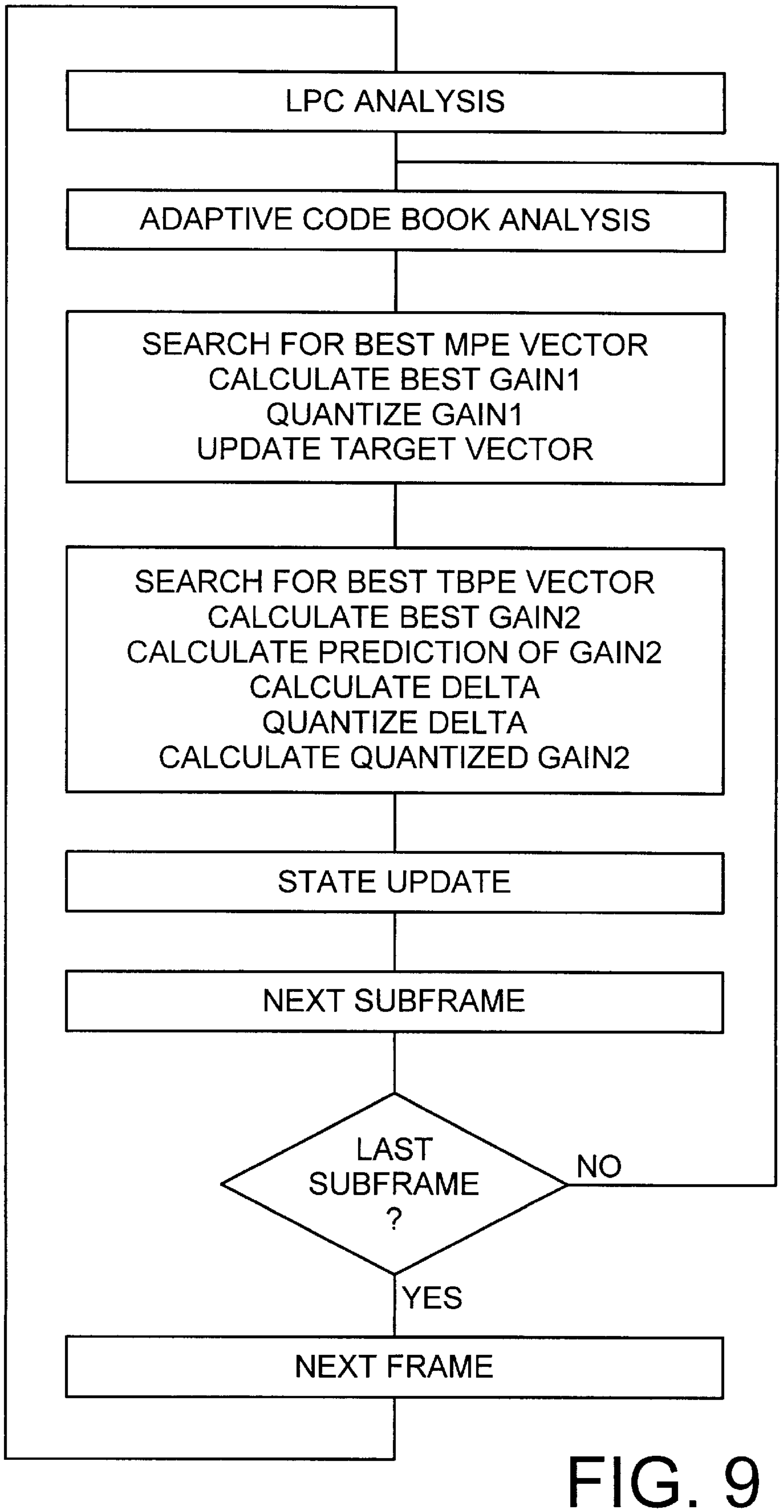
FIG. 9 is a flow chart illustrating the method in accordance with the present invention.

A flow chart illustrating the present invention is given in FIG. 9.

Figure 10:
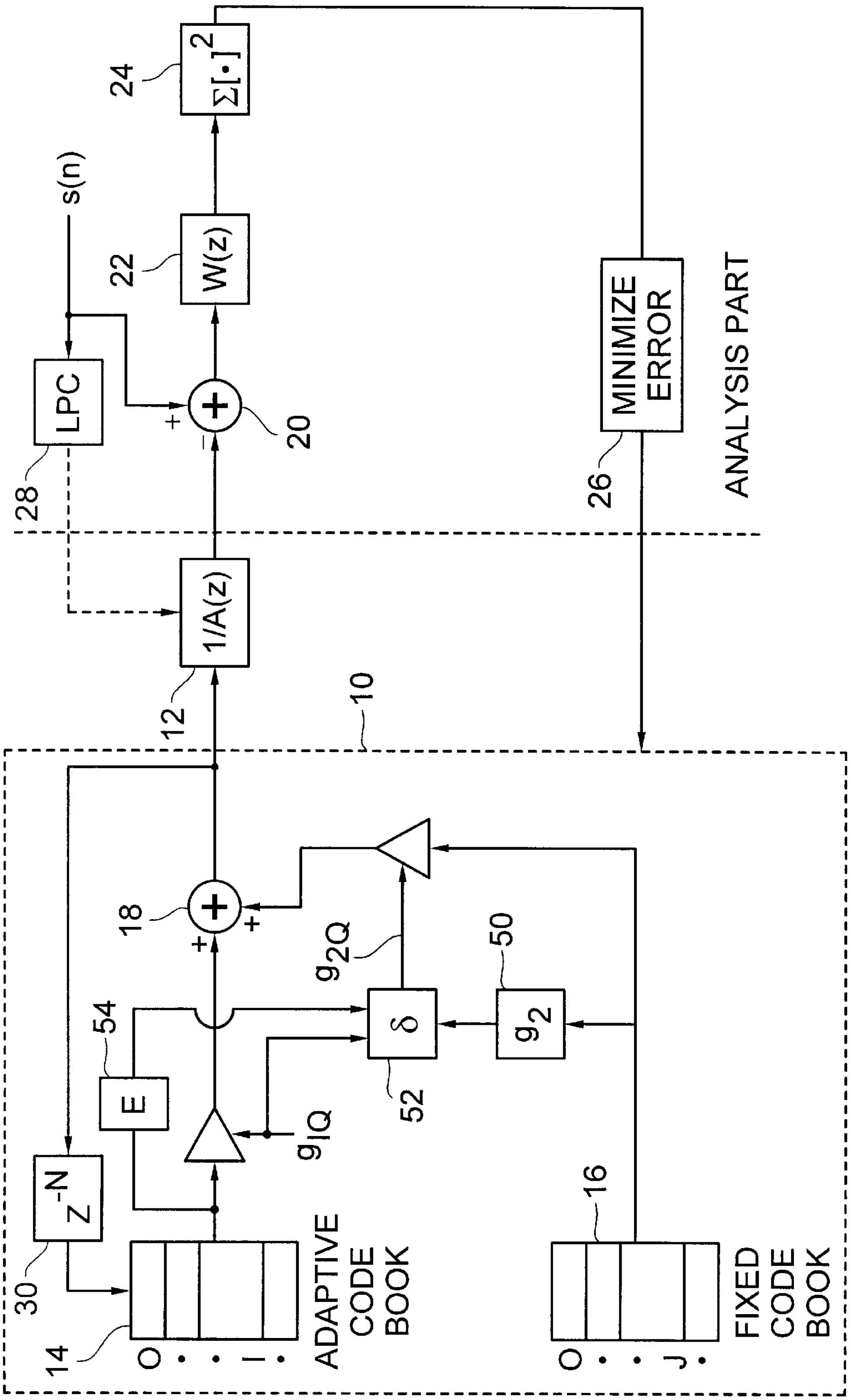
FIG. 10 is an embodiment of a speech coder that uses the method in accordance with the present invention.

FIG. 10 illustrates a speech coder corresponding to the speech coder of FIG. 1, but provided with means for performing the present invention. A gain $g_2$ corresponding to the optimal vector from fixed code book 16 is determined in block 50. Gain $g_2$, quantized gain $g_{1Q}$ and the excitation vector energy E (determined in block 54) are forwarded to block 52, which calculates $\delta_Q$ and quantized gain $g_{2Q}$. The calculations are preferably performed by a microprocessor.

Figure 11:
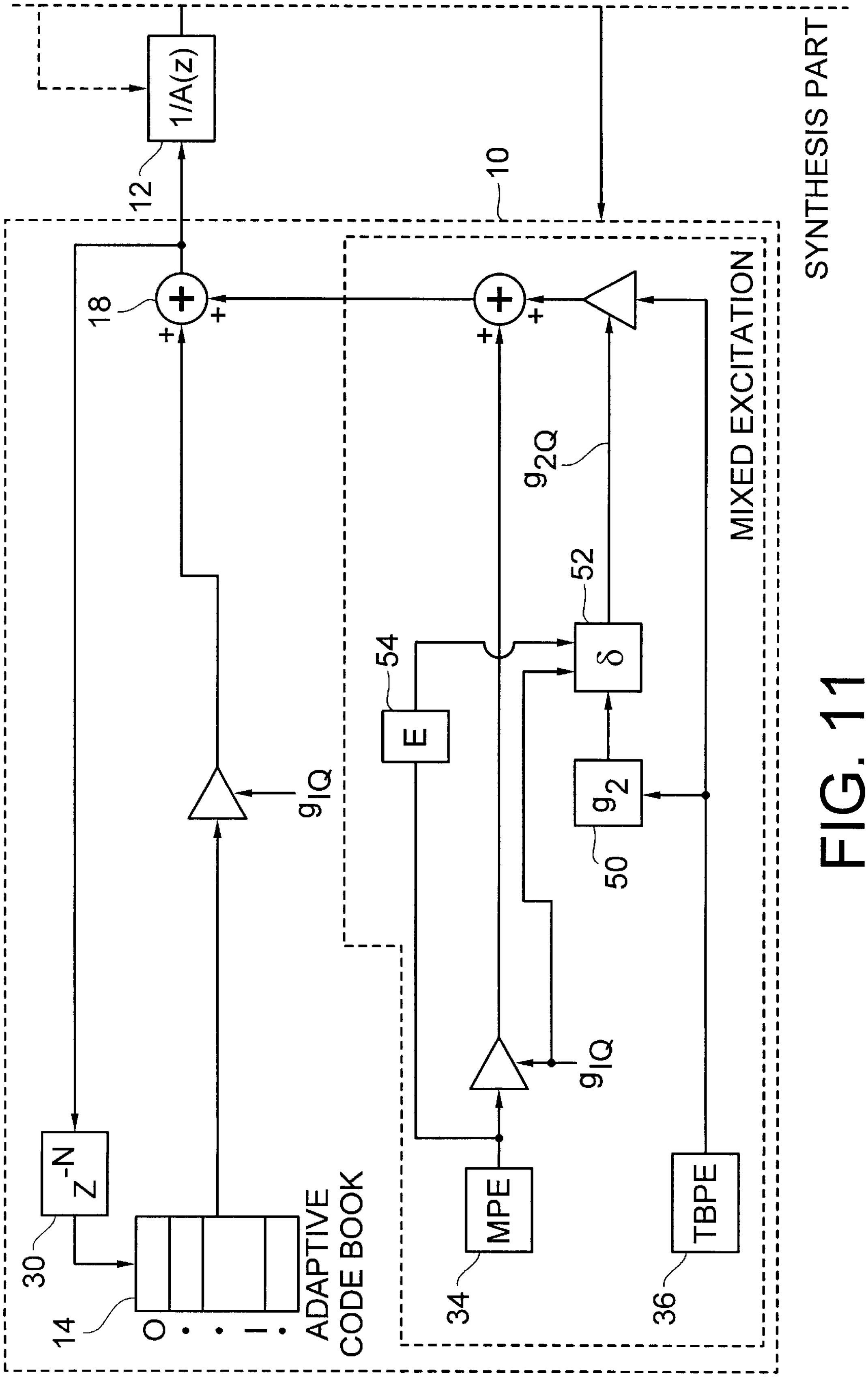
FIG. 11 is another embodiment of a speech coder that uses the method in accordance with the present invention.

FIG. 11 illustrates another embodiment of the present invention, which corresponds to the example algorithm given above. In this case $g_{1Q}$ corresponds to an optimal vector from MPE code book 34 with energy E, while gain $g_2$ corresponds to an optimal excitation vector from TBPE code book 36.

Figure 12:
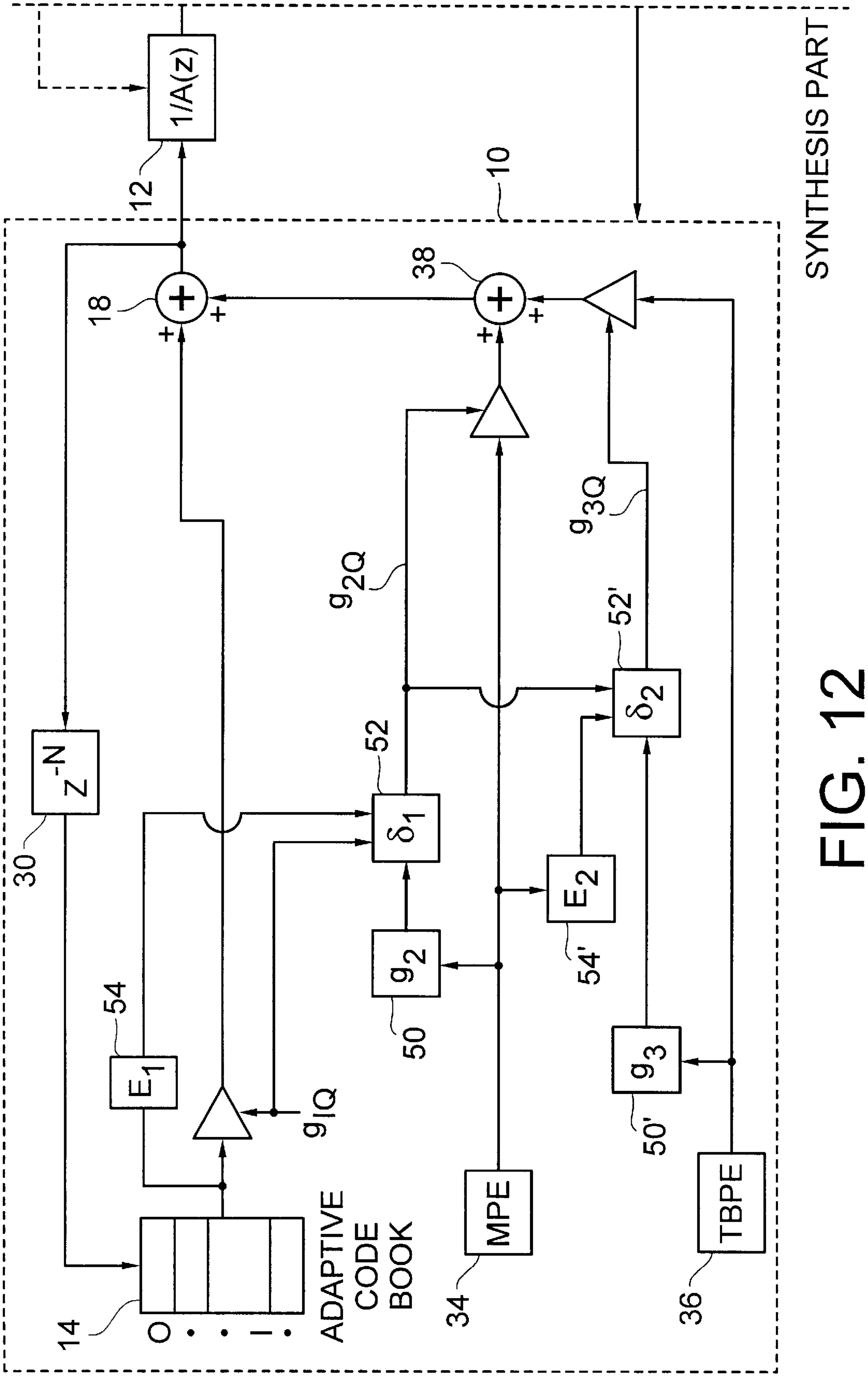
FIG. 12 is another embodiment of a speech coder that uses the method in accordance with the present invention.

FIG. 12 illustrates another embodiment of a speech coder in which a generalization of the method described above is used. Since it has been shown that there is a strong correlation between gains corresponding to two different code books, it is natural to generalize this idea by repeating the algorithm in a case where there are more than two code books. In FIG. 12 a first parameter $\delta_1$ is calculated in block 52 in accordance with the method described above. In this case the first code book is an adaptive code book 14, and the second code book is an MPE code book 34. However, since $g_{2Q}$ is calculated for the second code book, the process may be repeated by considering the MPE code book 34 as the "first" code book and the TBPE code book 36 as the "second" code book. Thus, block 52' may calculate $\delta_2$ and $g_{3Q}$ in accordance with the same principles as described above. The difference is that two linear predictions are now required, one for $g_2$ and one for $g_3$, with different constants "a" and "b".

In the above description it has been assumed that the linear prediction is only performed in the current subframe. However, it is also possible to store gains that have been determined in previous subframes and include these previously determined gains in the linear prediction, since it is likely that there is a correlation between gains in a current subframe and gains in previous subframes. The constants of the linear prediction may be obtained empirically as in the above described embodiment and stored in coder and decoder. Such a method would further increase the accuracy of the prediction, which would further reduce the dynamic range of δ. This would lead to either improved quality (the available quantization levels for δ cover a smaller dynamic range) or a further reduction of the number of quantization levels.

Thus, by taking into account the correlations between gains, the quantization method in accordance with the present invention reduces the gain bit rate as compared to the independent gain quantization method. The method in accordance with the invention is also still a low complexity method, since the increase in computational complexity is minor.

Furthermore, the robustness to bit errors is improved as compared to the vector quantization method. Compared to independent quantization, the sensitivity of the gain of the first code book is increased, since it will also affect the quantization of the gain of the second code book. However, the bit error sensitivity of the parameter δ is lower than the bit error sensitivity of the second gain $g_2$ in independent quantization. If this is taken into account in the channel coding, the overall robustness could actually be improved compared to independent quantization, since the bit error sensitivity of δ-quantization is more unequal, which is preferred when unequal error protection is used.

A common method to decrease the dynamic range of the gains is to normalize the gains by a frame energy parameter before quantization. The frame energy parameter is then transmitted once for each frame. This method is not required by the present invention, but frame energy normalization of the gains may be used for other reasons. Frame energy normalization is used in the program listing of the microfiche APPENDIX.

It will be understood by those skilled in the art that various modifications and changes may be made to the present invention without departure from the spirit and scope thereof, which is defined by the appended claims.

CITATIONS

[1] P. Kroon, E. Deprettere, "A class of Analysis-by-Synthesis predictive coders for high quality speech coding at rates between 4.6 and 16 kbit/s.", IEEE Jour. Sel. Areas Com., Vol. SAC-6, No. 2, February 1988

[2] N. Moreau, P. Dymarski, "Selection of Excitation Vectors for the CELP Coders", IEEE transactions on speech and audio processing, Vol. 2, No 1, Part 1, January 1994

[3] I. A. Gerson, M. A. Jasiuk, "Vector Sum Excited Linear Prediction (VSELP)", Advances in Speech Coding, Ch. 7, Kluwer Academic Publishers, 1991

[4] R. Salami, C. Laflamme, J. Adoul, "ACELP speech coding at 8 kbit/s with a 10 ms frame: A candidate for CCITT." IEEE Workshop on Speech Coding for telecommunications, Sainte-Adele, 1993

[5] P. Hedelin, A. Bergström, "Amplitude Quantization for CELP Excitation Signals", IEEE ICASSP -91, Toronto

[6] P. Hedelin, "A Multi-Stage Perspective on CELP Speech Coding", IEEE ICASSP -92, San Francisco

[7] B. Atal, J. Remde, "A new model of LPC excitation for producing natural-sounding speech at low bit rates", IEEE ICASSP-82, Paris, 1982.

[8] R. Salami, "Binary pulse excitation: A novel approach to low complexity CELP coding", Kluwer Academic Pub., Advances in speech coding, 1991.

What is claimed is:

1. A gain quantization method for excitations in analysis-by-synthesis linear predictive speech coding, comprising the steps of:

determining an optimal first gain for an optimal first vector from a first code book;

quantizing said optimal first gain;

determining an optimal second gain for an optimal second vector from a second code book;

determining a first linear prediction of the logarithm of said optimal second gain from at least said quantized optimal first gain; and quantizing a first difference between the logarithm of said optimal second gain and said first linear prediction.

2. The method of claim 1, wherein said first linear prediction includes the logarithm of the product of said quantized optimal first gain and a measure of the square root of the energy of said optimal first vector.

3. The method of claim 2, wherein said first code book is an adaptive code book and said second code book is a fixed code book.

4. The method of claim 3, wherein said measure comprises the square root of the sum of the squares of the components of said optimal first vector.

5. The method of claim 2, wherein said first code book is a multi-pulse excitation code book and said second code book is a transformed binary pulse excitation code book.

6. The method of claim 5, wherein said measure comprises the average pulse amplitude of said optimal first vector.

7. The method of claim 5, wherein the measure comprises a square root of the sum of the squares of the components of the optimal first vector.

8. The method of claim 1, comprising the further steps of:

determining and quantizing said optimal second gain from said quantized first difference;

determining an optimal third gain for an optimal third vector from a third code book;

determining a second linear prediction of the logarithm of said optimal third gain from at least said quantized optimal second gain; and quantizing a second difference between the logarithm of said optimal third gain and said second linear prediction.

9. The method of claim 8, wherein said first code book is an adaptive code book, said second code book is a multi-pulse excitation code book and said third code book is a transformed binary pulse excitation code book.

10. The method of claim 8, wherein said first and second linear predictions also include quantized gains from previously determined excitations.

11. The method of claim 1, wherein said first linear prediction also includes quantized gains from previously determined excitations.

* * * * *